United States Patent Office 2,694,706
Patented Nov. 16, 1954

2,694,706

ALKENYLAMINOALKANOYLPHENOTHIAZINE DERIVATIVES

John W. Cusic, Skokie, Ill., assignor to G. D. Searle & Co., Chicago, Ill., a corporation of Illinois No Drawing. Application January 9, 1952,
Serial No. 265,731

3 Claims. (Cl. 260—243)

This invention relates to compounds of the phenothiazine series having in the 10-position an aminoalkanoyl radical, to salts thereof, and to processes for producing such compounds. More particularly, this invention relates to new compositions of matter having the following general structural formula

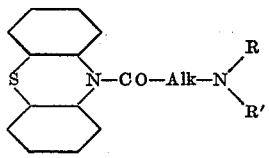

wherein Alk is a lower alkylene radical, R is a lower, unsaturated aliphatic hydrocarbon radical, and R' is a member of the class consisting of hydrogen, lower alkyl, lower alkenyl, lower aralkyl and lower hydroxyalkyl radicals, as well as to acid addition and quaternary ammonium salts of such bases.

The present application is a continuation-in-part of my copending applications, Serial Numbers 22,505 (issued as U. S. Patent 2,591,679) and 257,661, filed on April 21, 1948, and November 21, 1951, respectively.

The compounds of the above general formula are useful as intermediates in the prepartion of complex organic molecules such as pharmaceuticals. They are also of value as antioxidant, antiseptic, and surface-active agents, as well as medicinal agents such as diuretic, cardiovascular, and antispasmodic drugs. It is an object of this invention to provide novel compositions of matter which are of value for the foregoing uses. It is a further object to provide simple and efficient methods for manufacturing such substances.

In the foregoing general structural formula, Alk represents lower alkylene radicals containing between 1 and 10 carbon atoms, and preferably having 1 to 3 carbon atoms between the CO and NRR' groups. The radical Alk is a bivalent radical derived from a saturated aliphatic hydrocarbon radical, and includes such radicals as methylene, ethylene, propylene, the butylenes, and amylenes, and trimethylene, tetramethylene, and polymethylene radicals containing 1 to 10 carbon atoms. The radical R represents a lower alkenyl radical such as 2-propenyl, 2-butenyl, 3-butenyl, 2-pentenyl, 3-pentenyl, 4-pentenyl and hexenyl, or an alkyl substitution product thereof as methylpropenyl, ethylbutenyl and the like. The radical R' can be of the same type as radical R. It can also be a lower alkyl radical such as methyl, ethyl, straight-chained and branch-chained propyl, butyl, amyl or hexyl or a cycloalkyl radical such as cyclopropyl, cyclobutyl, cyclopentyl, cyclohexyl, methylcyclopentyl, and ethylcyclohexyl. It can also be a lower aralkyl radical such as benzyl and phenethyl or a lower hydroxyalkyl radical such as hydroxyethyl, hydroxypropyl and hydroxybutyl.

The phenothiazine nucleus of the foregoing compounds may be substituted in the benzenoid rings by halogen, alkyl or alkoxyl radicals.

The amino compounds which make up this invention are only slightly soluble in water, but are generally soluble in the common organic solvents. They readily form salts with acids, which salts are generally water soluble. Among the acids which are suitable for forming such salts are hydrochloric, hydrobromic, sulfuric, phosphoric, tartaric, citric, sulfamic, acetic, malic, maleic, benzoic, and similar common organic and inorganic acids which provide anions which are non-toxic in usual dosages. The 8-halogenated xanthines such as 8-chlorotheophylline, 8-bromotheophylline, and 8-chlorotheobromine are also satisfactory. Salts may also be formed by reacting the basic ketones with reactive esters of strong acids, to form quaternary ammonium salts. Such salts can be formed, for example, by reaction with esters such as methyl iodide, methyl chloride, ethyl bromide, propyl chloride, ethylene bromohydrin, propylene chlorohydrin, benzyl chloride, phenethyl bromide, dimethyl sulfate, methyl toluenesulfonate, ethyl benzenesulfonate, β-acetoxyethyl bromide, and related esters.

The compounds of this invention may be prepared by treating a compound having the following formula

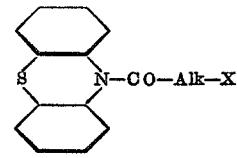

wherein Alk is a lower alkylene radical, and X represents halogen, with a primary or secondary aliphatic or aliphatic-type amine of the formula H—NRR', preferably at elevated temperature, in the presence of an inert solvent. In practice, it is preferred to use 2 or 3 moles of the amine for each mole of haloalkenoyl phenothiazine, in order that excess amine may bind the halogen acid split out during the reaction. It is preferred to run the reaction at temperatures of the range of 50–150° centigrade for a period of several hours. At the completion of the reaction, the amine salt is removed and the solution of the aminoalkanoyl phenothiazine base in the organic solvent is isolated. The base may be obtained in a state of purity by conventional procedures such as evaporation of the solvent and distillation, or the base may be converted to the acid addition salt by treatment of the solution with an equivalent amount of acid.

My invention is disclosed in further detail by the following examples, which present specific embodiments of my invention, without, however, limiting it in spirit or in scope. The amounts of materials are given in parts by weight.

*Example 1*

112 parts of phenothiazine and 73 parts of β-chloropropionyl chloride in 550 parts of benzene are refluxed for 20 hours. The hot solution is filtered and evaporated. The residue of 10-β-chloropropionylphenothiazine is recrystallized from alcohol, and melts at 135–136° C.

150 parts of 10-β-chloropropionylphenothiazine and 85 parts of piperidene in 870 parts of dry toluene are refluxed for 6 hours. The cooled solution is extracted with dilute mineral acid, and the acid extract is made alkaline and extracted with ether. The ether extract is dried and evaporated. The residue of 10-β-piperidinopropionylphenothiazine distils at 220–230° C. at 3 millimeters pressure. It is converted to the hydrochloride by treating a dry ether solution of the base with absolute alcoholic hydrogen chloride. The hydrochloride so formed is recrystallized from isopropanol and melts at 203–205° C.

By a reaction analogous to the foregoing but employing morpholine instead of piperidine, there is formed 10-β-morpholinopropionylphenothiazine which is a viscous high-boiling oil. By an alternative method 300 parts of 10-β-chloropropionylphenothiazine, 300 parts of morpholine, and 10 parts of potassium iodide in 800 parts of methyl ethyl ketone are heated at reflux temperature for 12 hours, cooled, and treated with dilute hydrochloric acid. The aqueous layer is separated and upon treatment with ether the crystalline hydrochloride of the 10-β-morpholinopropionylphenothiazine is obtained which, recrystallized from a mixture of isopropanol and ether, melts at about 222–223° C.

*Example 2*

29 parts of 10-β-chloropropionylphenothiazine and 12 parts of dimethylamine in 80 parts of methyl ethyl ketone containing 0.5 part of potassium iodide are heated in a closed vessel at 60–65° C. for 48 hours. The cooled reaction mixture is extracted with dilute mineral acid. The mineral acid solution is made alkaline and extracted with ether. After removal of the ether, the residue of 10-β-dimethylaminopropionylphenothiazine is crystallized from petroleum ether and melts at 86–88° C. When dissolved in ether and treated with absolute alcoholic hydrogen chloride, it forms a crystalline hydrochloride.

In a similar manner using 35 parts of dibutylamine in place of the dimethylamine one obtains 10-β-dibutylaminopropionylphenothiazine, which has the following structural formula

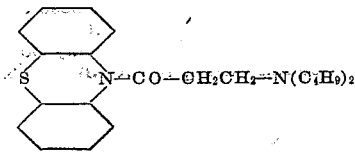

Example 3

15 parts of 10-β-dimethylaminopropionylphenothiazine and 5 parts of methyl chloride in 40 parts of acetone are mixed and allowed to stand at room temperature in a closed vessel. A precipitate of the quaternary salt, 10-β-dimethylaminopropionylphenothiazine methochloride, begins to form in about half an hour. After 15 hours, this is removed by filtration, washed and dried. After recrystallization from methyl ethyl ketone, it melts at about 208° C.

By a similar method using 11 parts of ethyl bromide there is produced the corresponding quaternary salt, 10-β-dimethylaminopropionylphenothiazine ethobromide.

Example 4

50 parts of phenothiazine and 36 parts of β-chlorobutyryl chloride in 350 parts of dry toluene are refluxed for about 15 hours. The hot solution is treated with decolorizing charcoal, filtered and evaporated. The residue of 10-β-chlorobutyrylphenothiazine is recrystallized from alcohol and melts at 158–160° C.

51 parts of 10-β-chlorobutyrylphenothiazine and 18 parts of dimethylamine in 80 parts of acetone containing 1 part of potassium iodide are heated in a closed vessel at 60° C. for 5 days. At the end of that time the solution is evaporated and the residue of 10-β-dimethylaminobutyrylphenothiazine crystallizes on standing. After recrystallization from petroleum ether, the base melts at 90–91° C. The hydrochloride is prepared by treating a dry ether-benzene solution of the base with absolute alcoholic hydrogen chloride. The 10-β-dimethylaminobutyrylphenothiazine hydrochloride is recrystallized from methyl ethyl ketone in the presence of decolorizing charcoal, and melts at 136–138° C.

By the reaction of the same quantities of 10-γ-chlorobutyrylphenothiazine (produced from phenothiazine and γ-chlorobutyryl chloride by the above process) and dimethylamine in acetone containing a trace of potassium iodide there is formed 10-γ-dimethylaminobutyrylphenothiazine, which, recrystallized from petroleum ether, melts at about 93–94° C. The hydrochloride melts at about 190–192° C.

Example 5

20 parts of 10-β-dimethylaminobutyrylphenothiazine and 8 parts of methyl chloride in 60 parts of methyl ethyl ketone are heated in a closed vessel for ½ hour at 60° C. and allowed to stand for 15 hours at room temperature. The heavy precipitate of the quaternary salt, 10-β-dimethylaminobutyrylphenothiazine methochloride, is removed by filtration, dried and recrystallized from isopropanol. This salt melts at 210–212° C.

By the same procedure, using 20 parts of benzyl chloride, there is formed the corresponding quaternary salt, 10-β-dimethylaminobutyrylphenothiazine benzylchloride.

Example 6

Other compounds which are produced by the foregoing procedures include the following:

A. 10-β-isopropylaminovalerylphenothiazine

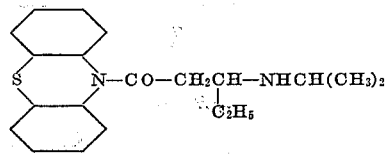

B. 10-γ-pyrrolidinobutyrylphenothiazine

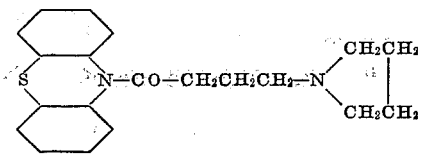

C. 10-methylethylaminoacetylphenothiazine

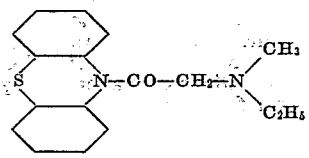

D. 10-β-dimethylaminopropionylphenothiazine 5-monoxide N-oxide

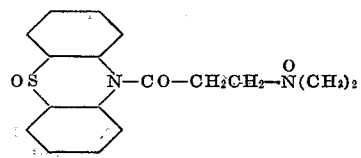

E. 10-β-dibutylaminopropionylphenothiazine 5-monoxide.

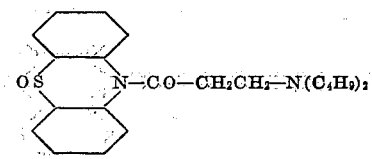

Example 7

A mixture of 58 parts of 10-β-chloropropionylphenothiazine and 40 parts of diethylamine in 120 parts of methyl ethyl ketone containing 1 part of potassium iodide is heated in a closed reactor for 5 days at 60–65° C. At the end of this period the solvent is removed and a portion of the residue of 10-β-diethylaminopropionylphenothiazine is distilled at 210–212° C. at 2 mm. pressure. It forms a crystalline hydrochloride melting at about 163–164° C.

By the same method, 10 parts of 10-β-chloropropionylphenothiazine are reacted with 7 parts of methylethanolamine and there is produced 10-β-methylethanolaminopropionylphenothiazine, which has the formula

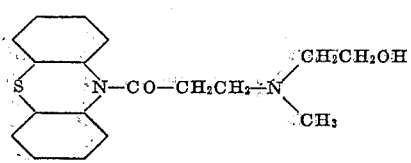

Recrystallized from ethanol it melts at about 129–130° C.

Example 8

100 parts of 10-β-diethylaminopropionylphenothiazine, prepared as in Example 7, are treated with 228 parts of methyl iodide in 400 parts of methyl ethyl ketone at 0° C. for 1 hour and then treated with ether. An oily precipitate forms which solidifies on standing for several hours. Recrystallized from ethanol, the methiodide of 10-β-diethylaminopropionylphenothiazine melts at about 202–203° C.

Upon addition of 150 parts of methyl bromide to a solution of 150 parts of 10-β-diethylaminopropionylphenothiazine in 400 parts of methyl ethyl ketone, an oily precipitate forms which solidifies on standing. The crystalline methobromide melts at about 202–204° C.

Example 9

A mixture of 289 parts of 10-β-chloropropionylphenothiazine and 250 parts of n-hexylamine in 1600 parts of toluene is heated at reflux temperature for 3 hours and then treated with dilute hydrochloric acid. The resulting precipitate is collected on a filter and recrystallized from ethanol. The hydrochloride of 10-β-n-hexylaminopropionylphenothiazine melts at about 191–192° C.

Example 10

289 parts of 10-β-chloropropionylphenothiazine are heated at reflux temperature for 2 days with 297 parts of cyclohexylamine and 10 parts of potassium iodide in 800 parts of methyl ethyl ketone and then concentrated and treated with ice and hydrochloric acid. The aqueous layer is separated and treated with benzene. On standing the 10-β-cyclohexylaminopropionylphenothiazine precipitates. Recrystallized from dilute isopropanol it melts at about 206–207° C. with decomposition.

Example 11

A mixture of 289 parts of 10-β-chloropropionylphenothiazine and 150 parts of allylamine in 1600 parts of toluene is heated at reflux temperature for 12 hours, then cooled and extracted with dilute hydrochloric acid. The extract is rendered alkaline and extracted with ether. This ether extract is dried over anhydrous potassium carbonate, filtered and evaporated to yield 10-β-allylaminopropionylphenothiazine. An ether solution of this base is treated with 1 equivalent of alcoholic hydrogen chloride to cause formation of a solid hydrochloride which, recrystallized from dilute isopropanol, melts at about 165–166° C. It has the structural formula

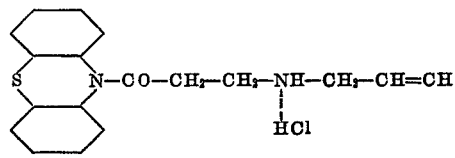

Example 12

A mixture of 289 parts of 10-β-chloropropionylphenothiazine, 194 parts of diallylamine and 10 parts of potassium iodide in 800 parts of methyl ethyl ketone is heated at reflux temperature for 3 days and then concentrated and treated with ice, hydrochloric acid, and ether. The aqueous layer is separated, rendered alkaline by addition of dilute sodium hydroxide, and extracted with ether. This ether extract is dried and evaporated to yield 10-β-diallylaminopropionylphenothiazine as an oil. Treatment of an ether solution of this oil with an equivalent of alcoholic hydrogen chloride and recrystallization of the precipitate yields a crystalline hydrochloride melting at about 131–133° C. It has the structural formula

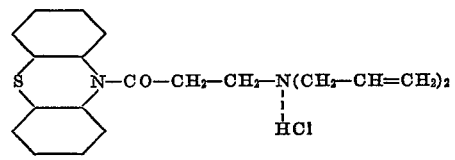

Example 13

100 parts of phenothiazine and 86 parts of ω-chlorocaproyl chloride in 800 parts of anhydrous toluene are heated at reflux temperature for 15 hours. The hot solution is stirred with decolorizing charcoal, filtered and evaporated to yield 10-ω-chlorocaproylphenothiazine. 33 parts of this chloride and 12 parts of N-ethyl-α-methyl-β-butenylamine, distilled at 145–150° C., in 80 parts of toluene are heated at reflux temperature for 3 days and then treated with dilute hydrochloric acid. The aqueous layer is separated, washed with ether, rendered alkaline by addition of potassium hydroxide, and extracted with ether. This extract is dried, stirred with decolorizing charcoal, filtered and evaporated to yield an amber, viscous oil. The 10-ω-[N-ethyl-N-(α-methyl-β-butenyl)amino]caproylphenothiazine has the structural formula

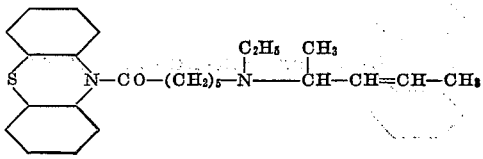

Reaction of 100 parts of 10-β-chloropropionylphenothiazine and 65 parts of N-methylallylamine in 200 parts of toluene by the same procedure yields the 10-β-(N-methyl-N-allylamino)propionylphenothiazine of the structural formula

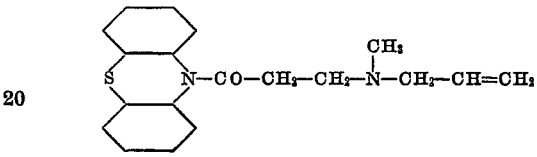

Example 14

A mixture of 300 parts of 10-β-chlorobutyrylphenothiazine and 170 parts of N-benzylcrotylamine in 2000 parts of toluene is heated at reflux temperature for 5 days and then treated with dilute hydrochloric acid. The aqueous layer is separated, washed with ether, rendered alkaline by addition of sodium hydroxide, and extracted with ether. This extract is dried, stirred with decolorizing charcoal, filtered and evaporated to yield the 10-β-(N-benzyl)crotylaminobutyrylphenothiazine as a light yellow, viscous, high boiling oil. Treatment of a solution of 30 parts of this base in 200 parts of methyl ethyl ketone with 10 parts of ethyl bromide at 80° C. for 3 hours yields the ethobromide, which has the structural formula

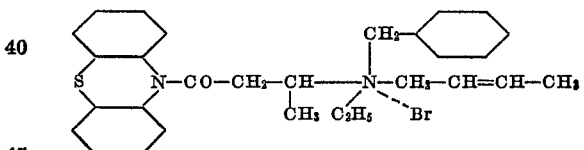

Example 15

A mixture of 20 parts of 10-chloroacetylphenothiazine and 10 parts of allylaminopropanol in 200 parts of toluene is heated at reflux temperature for 3 days and then treated with dilute hydrochloric acid. The aqueous layer is separated, washed with ether, treated with an excess of ammonium hydroxide and extracted with ether. The resulting extract is dried, stirred with decolorizing charcoal, filtered and evaporated to yield the allylhydroxypropylaminoacetylphenothiazine as a yellowish, viscous, high boiling oil of the structural formula

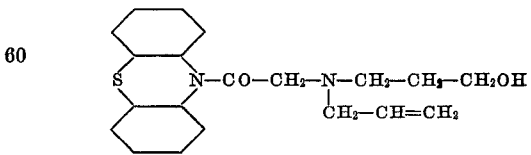

I claim:
1. An aminoalkanoylphenothiazine having the formula

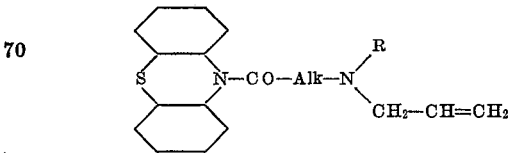

wherein Alk is a lower alkylene radical, and R is a member of the class consisting of hydrogen, and allyl radicals.

2. A compound of the structural formula

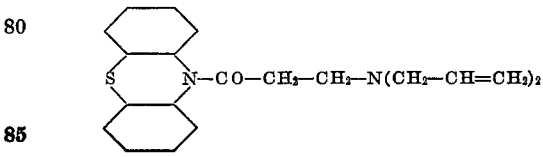

3. A compound of the structural formula
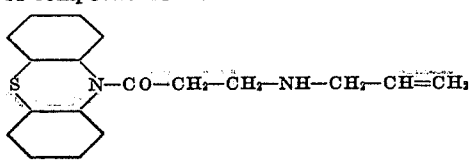
References Cited in the file of this patent
UNITED STATES PATENTS
| Number | Name | Date |
|---|---|---|
| 2,591,679 | Cusic | Apr. 8, 1952 |
OTHER REFERENCES
Idson: Chem. Reviews, vol. 47, pp. 493–497 (1950).